United States Patent Office 3,440,177
Patented Apr. 22, 1969

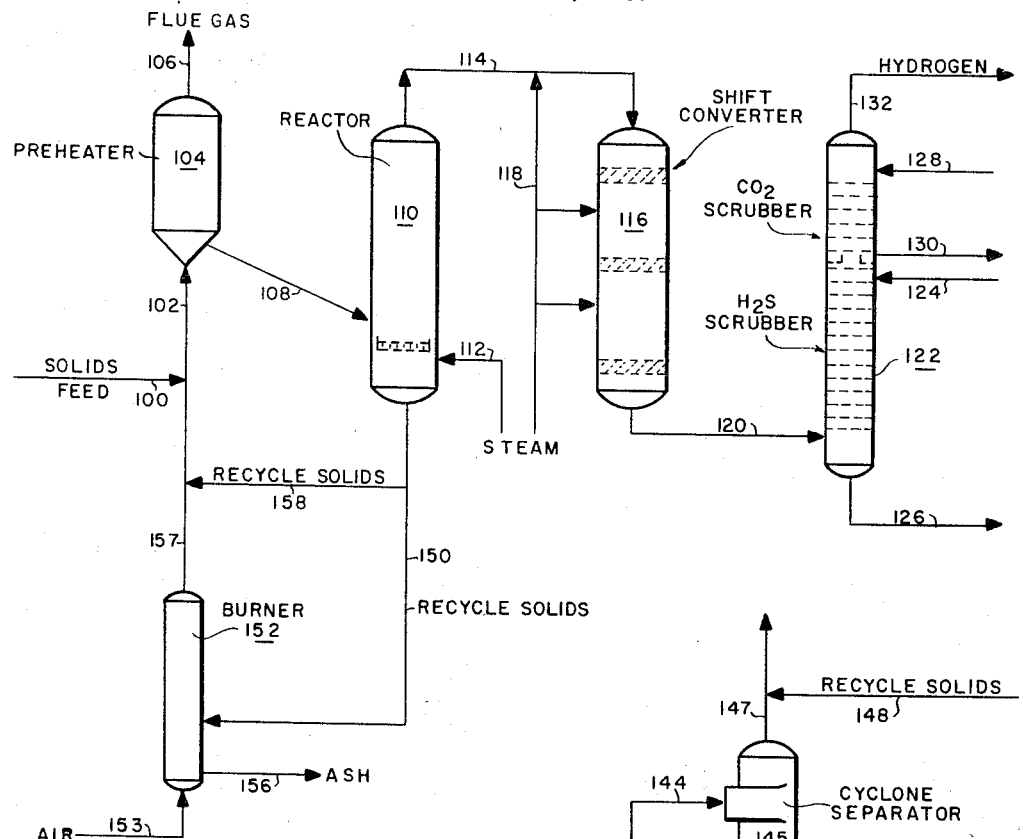

3,440,177
ASH REMOVAL IN GASIFICATION OF CARBONACEOUS SOLIDS
John T. Patton and Thomas W. Gillette, Houston, Tex., assignors to Esso Research and Engineering Company
Filed Dec. 18, 1967, Ser. No. 691,330
Int. Cl. C10k 1/02
U.S. Cl. 252—373       8 Claims

ABSTRACT OF THE DISCLOSURE

The gasification of an ash-containing solid carbonaceous material is carried out sequentially by the steps of preheating the fluidized solid carbonaceous material, contacting the carbonaceous material with steam in a reacting zone to partially convert the material, removing a stream of recycle solids from the reactor, burning a portion of the recycle solids to obtain a flue gas and an ash stream, withdrawing the ash stream, and utilizing the hot flue gas to reheat the other portion of recycle solids and the freshly introduced solids feed.

BACKGROUND OF THE INVENTION

Field of the invention

This invention relates to the gasification of carbonaceous solid materials such as coal to produce a gaseous product such as hydrogen and carbon monoxide.

Description of the prior art

The conversion of solid carbonaceous material into gaseous products by the water-gas reaction has been carried out in a continuous process utilizing a fluid bed. In the prior art schemes, however, the solid carbonaceous particles are partially burned either in a conventional fluid bed or in a transfer line combuster, and are then fed to the reaction vessel where they are contacted with water (steam) to produce hydrogen and carbon monoxide. By this scheme, the ash portion of the solids is retained in the system and it is not possible to remove the ash without also removing a portion of the hydrocarbonaceous feed.

Exemplary of the prior art is the Nelson et al. patent, U.S. 2,729,552, where,in by reference to FIG. 5, it is seen that the ash removal is accomplished by withdrawing a portion of the fluidized bed in the reaction zone. This scheme of removal involves the removal also of a portion of the hydrocarbonaceous feed material and is a net loss. Another similar patent is the Lewis patent, U.S. 2,631,934. In the Lewis patent, the problem of ash removal is solved by utilizing a two-stage reaction zone; the second stage reactor is the zone wherein carbon is burned to provide a flue gas containing all the oxygen for the reaction. For this reason, flue gas is passed from reactor 1 (the second-stage reactor) into reactor 2. The flue gas acts as a diluent and makes it difficult to obtain the efficiencies which are required. By the present invention, in contrast, the flue gas is passed out of the system so that the water-gas reaction is carried out in a steam-enriched atmosphere.

Summary of the invention

The present invention is directed to the gasification of solid carbonaceous materials such as coal, shale, peat, lignite, etc. These materials contain metal oxides which are referred to in the trade as ash. In the conversion of all of the carbon in the solids into carbon monoxide and carbon dioxide, the ash constituents are left as a residue which must be removed from the reaction zone, or they will build up and ultimately cause the process to become inoperative. At this point the system must be shut down and the ash removed. By the present process, in contrast, the ash is continuously removed from the system, thereby preventing the buildup which is otherwise to be expected. Further, the ash is removed as a substantially carbon-free stream, thereby avoiding the uneconomical loss of carbon.

The present invention also involves the use of the flue gas from the combustion of ash-containing carbonaceous materials to preheat the recycle solid stream and the fresh solids feed stream, but without reintroducing the flue gas into the reaction zone where it would act as a diluent.

The process is carried out in several stages, the primary stage, of course, being the reaction zone wherein is carried out the water-gas reaction in a fluidized bed. Unreacted solids, containing ash, are removed from the reaction zone and divided into two portions. One portion of the recycle solids is passed into a combustion zone where it is contacted with air and burned to substantially completely consume the carbon contained therein. The ash is removed from the reaction zone as a substantially carbon-free stream. The flue gas which is produced thereby, together with the remaining portion of recycle solids and the fresh solids are fed into another fluidized bed, where preheating is completed. The flue gas is separated from the solids in the preheating zone and the solids are then transferred into the reaction zone where they are contacted with steam for carrying out the water-gas reaction.

The products of the water-gas reaction are further treated in a shift converter to cause the carbon monoxide to be changed into carbon dioxide, and the carbon dioxide is removed along with $H_2S$ in a third zone to leave a substantially pure hydrogen stream.

Each of the main reaction zones will be discussed separately below.

Reaction zone

In the reaction zone, the preheated solids feed and recycle solids are contacted with steam at a temperature within the range from about 1600° F. to about 2400° F. (preferably 1800+° F.) and a pressure from 0 p.s.i.g. to 1000 p.s.i.g. (preferably 250 p.s.i.g.) and for an average residence time for the solids materials of 0.01 to 10 hours (preferably 0.5 hour). In the reaction zone the weight ratio of the solids to steam is generally within the range from 10 to 1000 (preferably 50), the conditions being chosen to obtain a conversion of the solid carbon-containing material within the range from about 60% to about 95% (preferably 85%). The gaseous product of the reaction contains about 20 to 60 volume percent hydrogen (preferably 47%) and from 30 to 60 volume percent carbon monoxide (preferably 43%). The steam which is introduced into the reaction zone may be at a pressure from 0 to 1000 p.s.i.g. (preferably 250 p.s.i.g.) and may contains from 0 to 1000° F. of superheat (preferably 200° F.).

Burning zone

The unconverted solid material is withdrawn from the reaction zone and split into two parts. The first portion of the recycle solids is conducted into a burning zone, which may be a fluidized bed, a transfer line burner, or other suitable device. In the burning zone, the first portion of the recycle solid is substantially completely combusted so that an ash-enriched stream is withdrawn. In the case of a fluidized bed burner, of course, the stream which is withdrawn will be essentially the same composition as the remaining bed, and thus will be higher in carbon content than in the transfer line burner where the ash can be separated after substantially complete combustion. The first portion of the recycle stream amounts only to about 10% of the total recycle solids, however, and therefore the amount of carbon which is lost in the ash stream even when using a fluidized bed burner is quite small.

In the burning zone, the recycle solids are contacted with air in a sufficient quantity substantially to burn all of the carbon which is contained in the solid material. The amount of air which is introduced is sufficient to maintain combustion, and also sufficient to consume the carbon in the solids being introduced, so that the burner is in stoichiometric balance with the recycle solid stream being introduced therein. The burner generally may operate at a temperature within the range from 2000 to 3500° F., a pressure from 0 to 1000 p.s.i.g., an air rate of 1 to 10 pounds per pound of coal per hour, and an average solids residence time of about 0.1 to 100 minutes. The flue gas will be discharged from the burning zone at a temperature from 1800 to 3500° F. (preferably 2400° F.) and will contain from 10 to 20 volume percent $CO_2$, from 0.1 to 10 volume percent CO, from 0.01 to 0.1 volume percent $H_2O$, and from 0.1 to 5.0 volume percent oxygen. The flue gas may also carry some small particles of the solids as an entrained portion of the stream.

The ash-containing stream which is removed from the burning zone generally will be withdrawn at a rate of about 30 to 70% of the rate of introduction of recycle solids into the burning zone, preferably 50 weight percent.

Preheating zone

The recycle solids which are carried into the preheating zone may comprise from 70 to 95 weight percent of the total solids withdrawn from the reactor, preferably 85 weight percent. The recycle solids are admixed with the fresh solids feed, and are lifted into the preheating zone by the flue gas from the burning zone. The ratio of solids feed to recycle solids will be within the range of 0.05 to 2.0, preferably 0.1. The solids feed will comprise a finely divided carbonaceous material, preferably having particles within the size range from 50 to 300 Tyler mesh, with the majority falling within the range of 70 to 160 mesh.

In the preheating zone, the combined carbonaceous material stream is maintained in contact with the hot flue gas stream at a ratio of the combined carbonaceous materials to flue gas, per hour, being within the range from about 0.5 to 5 pounds per hour of flue gas per pound of combined carbonaceous materials. The temperature within the preheating zone is about 1800 to 3500° F., preferably 2100° F. The carbonaceous material, preferably being maintained in the form of a fluidized stream, is withdrawn from the preheating zone at a temperature of 1600 to 2800° F. (preferably 2100° F.) and is introduced into the reaction zone.

Shift conversion

The treatment of the gaseous stream produced in the reaction zone forms no part of the present invention and is discussed only for clarity and to provide a complete understanding of the present invention. The gaseous products from the reaction zone are passed, preferably with additional steam, into contact with a shift conversion catalyst such as iron oxide, at a temperature of about 800° F. and a pressure of about 250 p.s.i.g. In the shift converter, the carbon monoxide is changed into carbon dioxide with the generation of additional hydrogen. The gaseous product of the shift converter, containing hydrogen, carbon dioxide, and $H_2S$ (from sulfur in the solids feed), is then passed into an $H_2S$ separator for removal of $H_2S$, and into a treating zone for the removal of carbon dioxide. Thus, the hydrogen may be obtained as a substantially pure product.

DISCUSSION OF THE DRAWINGS

The invention is disclosed in the drawings schematically in FIG. 1 which is schematic flow diagram of the present invention and in FIG. 2 which discloses an alternative system for burning a portion of the recycle solids.

Referring now to FIG. 1, it is seen that the solids may be introduced into the system by way of a line 100. For the purposes of this descirption it will be assumed that the solids are a finely divided bituminous coal. The coal particles are lifted in line 102 into a preheater zone 104, wherein it is maintained (in admixture with recycle solids as hereinafter discussed) in a fluidized bed for a time sufficient to raise the temperature of the fine solids stream to about 2100° F. A flue gas stream is separated from the solids and withdrawn by way of line 106, and the heated solids are carried by way of line 108 into the reactor 110.

In the reactor 110 the solids are contacted with steam which is introduced by way of line 112, under conditions chosen to induce reaction with the carbonaceous portion of the solids and to produce a gaseous stream comprising hydrogen, carbon monoxide, hydrogen sulfide and some traces of carbon dioxide. This gaseous product is withdrawn by way of line 114 and is passed into the shift converter 116 in contact with additional steam introduced by way of the system 118. In the shift converter, the carbon dioxide is produced from carbon monoxide, and a gaseous product substantially free of carbon monoxide is withdrawn by way of line 120 and introduced into the scrubbing system 122. In the zone 122 the gas is sequentially contacted with an absorbent for $H_2S$ such as monoethylnolamine (MEA), which is introduced by way of line 124, and which is withdrawn by way of line 126 and then with a solvent for carbon dioxide such as potassium carbonate which is introduced by way of line 128 and withdrawn by way of line 130. The purified hydrogen stream is withdrawn by way of line 132, containing only about 0.5% $CO_2$ and 0.1% $H_2S$.

Referring now to FIG. 2, an alternative system for carrying out the combustion of a portion of the recycle solids is set forth. In the embodiment shown in FIG. 2, a portion of the recycle solid is introduced by way of line 140 into a transfer line burner 142 wherein it is contacted with air introduced by way of line 143. The solids are substantially completely burned in their transit through the transfer line burner and are introduced by way of line 144 into a cyclone separator 145, wherein the unburned constituents, mainly ash, are withdrawn by way of line 146 and a flue gas product is withdrawn by way of line 147. The second portion of recycle solids is introduced by way of line 148 into the flue gas stream for transportation into the preheating zone.

Returning now to FIG. 1, the similar system for burning the recycle solids is shown as comprising a burner 152 into which the recycle solids are carried by way of line 150, and are contacted with air introduced by way of line 153. An ash-enriched stream is withdrawn by way of line 156, and a flue gas stream is withdrawn by way of line 157. The recycle solids from the reactor are introduced by way of line 158 into the flue gas stream, and are carried in the flue gas stream into the preheater 104 along with solids which are introduced by way of line 100.

Having disclosed our invention, along with a preferred embodiment and an alternative thereto, what is desired to be protected by Letters Patent should be determined from the appended claims and not by the specific examples herein given.

We claim:
1. A process of producing hydrogen and carbon monoxide by the reaction of steam with a solid carbon-containing material which comprises in a reaction zone, reacting the carbon-containing material with steam to produce a gaseous product and an unconverted carbon containing recycle solid stream, separating said recycle solid stream into two portions, a first portion and a second portion, burning said first portion to produce an ash-enriched stream and a flue gas stream, withdrawing the ash-enriched stream from the system, introducing the second portion of the recycle solid into the flue gas stream, introducing a fresh solids feed into said flue gas stream in admixture with said recycle solids, separating the flue gas stream from the admixed solids, and introducing the admixed solids into the reaction zone as the feed stream thereto.

2. A method in accordance with claim 1 wherein the first portion of the recycle solids is about 5 to 50 weight percent of the total recycle solids.

3. A method in accordance with claim 2 wherein the ash-enriched stream comprises about 30 to 70 weight percent of the first portion of recycle solids.

4. A method in accordance with claim 3 wherein the fresh solids feed is about 1 to 100 weight percent of the second portion of the recycle solids.

5. A method in accordance with claim 4 wherein the reaction zone is maintained at a temperature within the range of 1000 to 2500° F. and a pressure of 0 to 1000 p.s.i.g.

6. A process of producing hydrogen and carbon monoxide by the reaction of steam with a solid carbon-containing material which comprises in a reaction zone, at a temperature within the range from 1000 to 2500° F. and a pressure from 0 to 1000 p.s.i.g., contacting a finely divided carbon-containing solid material with steam at a residence time for the carbon-containing material within the range from 0.01 hr. to 10 hrs., a weight ratio of the carbon-containing material to steam within the range from 10 to 1000 and under conditions chosen to obtain a conversion of the carbon-containing material within the range from 60 to 90 into a product containing from 30 to 60 volume percent hydrogen and from 30 to 60 volume percent carbon monoxide, withdrawing a recycle stream of said carbon-containing material in quantities sufficient to provide a recycle ratio within the range from 1 to 20, based upon the fresh feed of carbonaceous material into the reactor as hereinafter described, separating said recycle stream into a first portion and a second portion, said first portion comprising from 60 to 90 weight percent of the entire recycle stream, in a burning zone contacting said first portion with air at a coal-to-air weight ratio of 0.01 to 1.0, a coal residence time of about 0.1 min. to 100 min., a pressure from about 0 to 1000 p.s.i.g., sufficient to obtain a heated flue gas having a temperature from 1800 to 3500 and containing from 10 to 20 volume percent $CO_2$, from 0.10 to 10 volume percent CO, and from 0.1 to 5.0 volume percent oxygen, and to obtain an ash-enriched carbonaceous material stream which is removed from the burning zone, said ash-enriched carbonaceous material stream having a ratio to the first portion of about 30 to 70%, withdrawing the heated flue gas from said burning zone, introducing said second portion of the recycle stream and fresh carbonaceous material into said hot flue gas stream, the ratio of fresh carbonaceous material feed to said second portion being within the range from 0.01 to 1.0, and the ratio of the combined carbonaceous materials to the flue gas, by weight, being within the range from 0.5 to 5.0, maintaining the combined carbonaceous material stream in contact with the hot flue gas stream until the carbonaceous material has reached a temperature from 1600 to 2800° F., and thereafter separating the flue gas from said combined hydrocarbon carbonaceous material stream, and introducing the thus heated combined carbonaceous stream to said reaction zone.

7. A method in accordance with claim 6 wherein the reaction zone temperature is about 1800° F., the pressure is about 250 p.s.i.g., the residence time for carbon-containing material in the reaction zone is about 0.1 hour, the ratio of carbon-containing material to steam is about 50, and the conversion of carbon-containing material is about 85%.

8. A method in accordance with claim 7 wherein the fresh feed is about 15% of the second portion of the recycle stream.

References Cited

UNITED STATES PATENTS

| | | | |
|---|---|---|---|
| 2,554,263 | 5/1951 | Nelson | 252—373 |
| 2,694,047 | 11/1954 | Glozier | 252—373 |

OSCAR R. VERTIZ, *Primary Examiner.*

HOKE S. MILLER, *Assistant Examiner.*

U.S. Cl. X.R.

23—212, 289